US009321450B2

(12) United States Patent
DeGroot et al.

(10) Patent No.: US 9,321,450 B2
(45) Date of Patent: Apr. 26, 2016

(54) SYSTEM AND METHOD FOR PROCESSING ENGINE ROUGHNESS FOR COLD START FUEL CONTROL VIA ELECTRIC MOTOR (71) Applicants: Kenneth P DeGroot, Macomb Township, MI (US); Sashidhar Velnati, Oxford, MI (US); Timothy A Coatesworth, Bloomfield Hills, MI (US); Mengyang Zhang, Troy, MI (US); Scott A Reynolds, Shelby Township, MI (US)

(72) Inventors: Kenneth P DeGroot, Macomb Township, MI (US); Sashidhar Velnati, Oxford, MI (US); Timothy A Coatesworth, Bloomfield Hills, MI (US); Mengyang Zhang, Troy, MI (US); Scott A Reynolds, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 59 days.

(21) Appl. No.: 14/192,196

(22) Filed: Feb. 27, 2014

(65) Prior Publication Data
US 2015/0239458 A1   Aug. 27, 2015

(51) Int. Cl.
*B60W 20/00*     (2006.01)
*B60W 10/08*     (2006.01)
*B60W 10/06*     (2006.01)
*B60K 6/48*      (2007.10)
*F02D 33/00*     (2006.01)
*F02D 41/14*     (2006.01)
*F02D 41/34*     (2006.01)

(52) U.S. Cl.
CPC ............ *B60W 20/10* (2013.01); *B60K 6/48* (2013.01); *B60W 10/06* (2013.01); *B60W 10/08* (2013.01); *F02D 33/003* (2013.01); *F02D 41/1498* (2013.01); *F02D 41/34* (2013.01); B60K 2006/4825 (2013.01); *B60W 20/50* (2013.01); *B60W 2510/081* (2013.01); *B60W 2510/083* (2013.01); *B60W 2710/0627* (2013.01); *F02D 2200/021* (2013.01); *F02D 2200/0406* (2013.01); *F02D 2200/101* (2013.01); *F02D 2250/24* (2013.01); *Y02T 10/6286* (2013.01); *Y10S 903/93* (2013.01)

(58) Field of Classification Search
USPC .......................................................... 701/22
IPC .................................................... B60W 20/00
See application file for complete search history.

(56) References Cited

U.S. PATENT DOCUMENTS

| 5,901,684 | A | | 5/1999 | Borland et al. |
|---|---|---|---|---|
| 6,007,443 | A | * | 12/1999 | Onimaru et al. .................. 475/5 |
| 6,018,694 | A | * | 1/2000 | Egami et al. .................... 701/102 |
| 6,442,455 | B1 | | 8/2002 | Kotre et al. |
| 6,845,305 | B1 | | 1/2005 | Raftari et al. |
| RE42,631 | E | | 8/2011 | Nakayama et al. |
| 2003/0173123 | A1 | * | 9/2003 | Nakanowatari .......... B60K 6/44 180/65.225 |
| 2006/0224282 | A1 | * | 10/2006 | Seo ........................ B60K 6/365 701/22 |
| 2006/0276952 | A1 | * | 12/2006 | Niessen et al. ................ 701/101 |
| 2007/0093359 | A1 | * | 4/2007 | Kobayashi et al. ........... 477/107 |
| 2007/0119413 | A1 | * | 5/2007 | Lewis et al. .................... 123/295 |
| 2010/0204908 | A1 | * | 8/2010 | Nakai ............................ 701/112 |
| 2012/0053820 | A1 | * | 3/2012 | Nishikiori et al. ............ 701/103 |
| 2013/0204478 | A1 | * | 8/2013 | Watanabe et al. .............. 701/22 |

* cited by examiner

*Primary Examiner* — Stefanos Karmis
*Assistant Examiner* — Michael E Butler
(74) *Attorney, Agent, or Firm* — Ralph E. Smith (57) ABSTRACT A system and method for controlling an engine in a hybrid vehicle based on the use of a calculated combustion stability value to modify a pulsewidth signal to fuel injectors of the engine to reduce hydrocarbon emissions, especially following an engine start. The calculated combustion stability value is determined as a function of a torque signal obtained from an electric motor of the hybrid vehicle.

14 Claims, 6 Drawing Sheets

SYSTEM AND METHOD FOR PROCESSING ENGINE ROUGHNESS FOR COLD START FUEL CONTROL VIA ELECTRIC MOTOR

FIELD

The present disclosure generally relates to internal combustion engines in hybrid vehicles and, more particularly, to a system and a method for determining combustion stability of the engine and controlling the fuel injection pulsewidth to fuel injectors of the engine based on a torque signal obtained from the vehicle's one or more electric motors.

BACKGROUND

Automotive vehicles commonly employ a port-injected internal combustion engine in which a fuel injector sprays fuel into an intake manifold of the engine near an intake valve of a cylinder. A conventional fuel injector is typically controlled in response to a fuel injection pulsewidth signal where the pulsewidth determines the amount of fuel injected into the corresponding cylinder of the engine. The fuel injection pulsewidth signal may be based on a calculated target fuel injection mass, where the goal of the calculated target fuel injection mass is to provide adequate engine performance when post combustion sensor feedback-based engine control is not available.

Many automotive vehicles commonly employ an oxygen sensor generally disposed upstream of the catalyst system for sensing the oxygen level in the exhaust gas emitted from the engine. The oxygen sensor can serve to provide a feedback signal to control engine operation and adjust fuel injection to the engine to achieve good engine performance. However, some conventional oxygen sensors are required to warm up to a sufficiently high temperature before an accurate oxygen sensor reading may be obtained. Also, following an engine start, the oxygen sensor and processing devices often have not acquired enough information to provide adequate feedback control. Therefore, for a period of time immediately following start-up of the engine, the oxygen sensor may not be capable of providing accurate information with which the engine may be accurately controlled to achieve low hydrocarbon emissions. As a consequence, excessive hydrocarbon emissions may be emitted from the vehicle within the immediate period following start-up of the engine.

Additionally, immediately following an engine start, the catalytic converter can be ineffective since the catalyst requires a period of time to warm up to a temperature at which the catalyst can operate effectively to oxidize excess hydrocarbons. As a consequence, exhaust tailpipe hydrocarbon emissions may initially be high due to poor burning of the excess hydrocarbons. To add to the problem, an overabundance of hydrocarbons in the catalyst may further cool the catalyst, thereby requiring an extended period of time for the catalyst to function efficiently.

Evaluation of combustion performance of an engine may be used to improve engine control and to evaluate hardware changes made to the engine. One metric, combustion stability, can be measured by processing engine speed signals taken over an angular displacement of the expansion stoke of the engine cylinders. By computing a level of engine roughness, engine operation may be controlled while other feedback is unavailable, for example, when the oxygen sensor is too cold. However, in hybrid vehicles, an electric motor often controls the speed of the combustion engine making engine stability and roughness measurements hard or impossible to obtain because the electric motor is controlled faster than the combustion engine, especially at lower engine speeds. Accordingly, there is a need for improvements in the fuel control system of a hybrid vehicle to allow for computation of engine roughness, or some equivalent measure, to modify fuel injection so as to improve fuel economy and hydrocarbon emissions while maintaining adequate performance of the vehicle.

SUMMARY

The present disclosure provides a system and a method for controlling an engine in a hybrid vehicle based on the use of a calculated combustion stability value to modify the pulsewidth signal to the fuel injectors of the engine so as to change the amount of fuel applied to the engine to reduce hydrocarbon emissions, especially following a cold engine start. The calculated combustion stability value is determined as a function of a torque signal obtained from an electric motor of the hybrid vehicle.

According to one embodiment, the calculated combustion stability value is advantageously employed to modify the fuel injection to an internal combustion engine, to reduce hydrocarbon emissions. This is accomplished by modifying a calculated target fuel injection signal pulsewidth as a function of the calculated combustion stability value to change the fuel injected into the engine. By changing fuel injection in this manner, reduced hydrocarbon emissions can be realized while maintaining good drivability and performance of the vehicle.

Further areas of applicability of the present disclosure will become apparent from the detailed description provided hereinafter. It should be understood that the detailed description, including disclosed embodiments and drawings, are mere exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
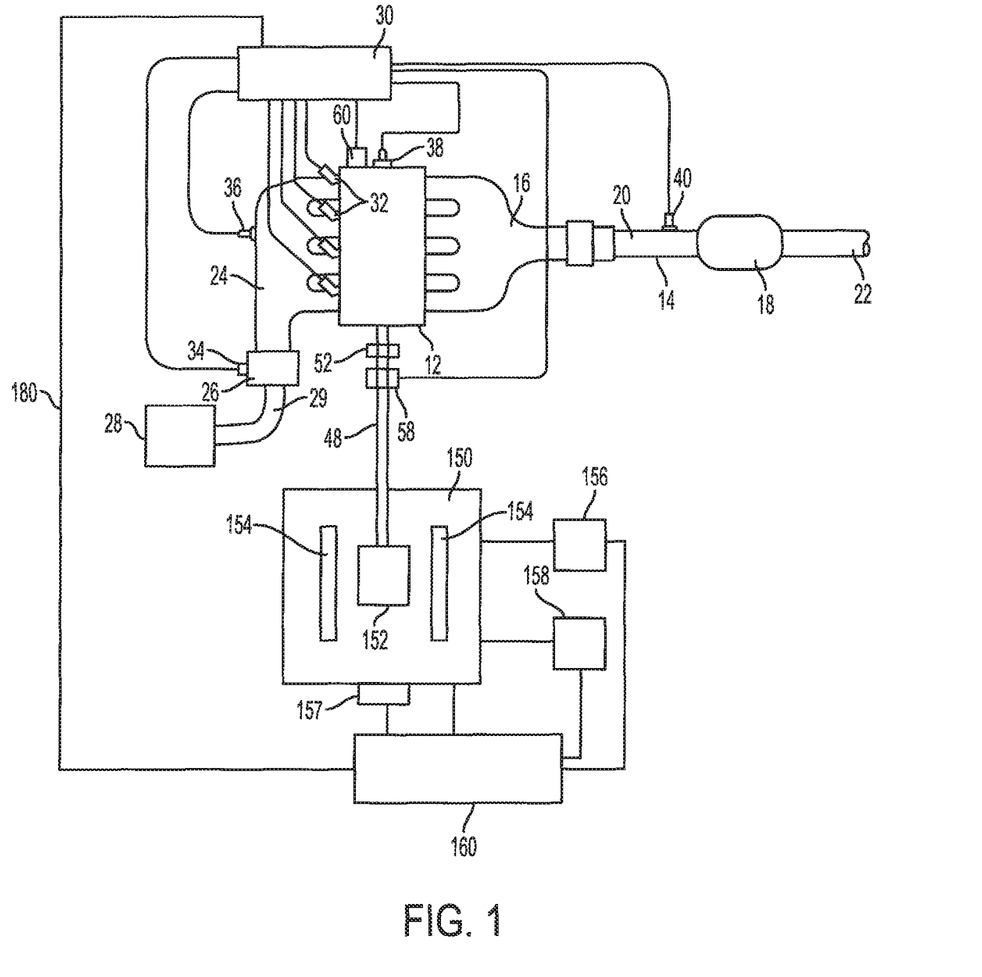
FIG. 1 is a schematic diagram of an electronic fuel injection system illustrated in operational relationship with an internal combustion engine, an exhaust system, and an electric motor/generator of a hybrid automotive vehicle, containing components for measuring characteristics of the combustion engine and the electrical motor to modify fuel injection.

FIG. 1 depicts an electronic fuel injection system in operational relationship with an internal combustion engine 12, an exhaust system 14, and an electrical motor/generator 150 of a hybrid vehicle. FIG. 1 also depicts components of the hybrid vehicle used for measuring the characteristics of internal combustion engine 12 and electric motor/generator 150 to control and modify the fuel injection provided to engine 12.

As shown in FIG. 1, exhaust system 14 includes an exhaust manifold 16 connected to the engine 12 and a catalyst 18 such as a catalytic converter connected by an upstream conduit 20 to the exhaust manifold 16. The exhaust system 14 also includes a downstream conduit 22 connected to the catalyst 18 and extending downstream to a muffler (not shown). The internal combustion engine 12 is a fuel injected engine and includes an intake manifold 24 connected to the engine 12 and a throttle body 26 connected to the intake manifold 24. Within engine 12, multiple pistons within cylinders (not shown) are operatively connected by a connecting rod to crankshaft 48. A camshaft (not shown) is used to open and close cylinder valves for the various strokes of the pistons. Engine 12 also includes an air filter 28 connected by a conduit 29 to the throttle body 26.

The electronic fuel injection system of the vehicle includes an engine controller 30 having fuel injector output lines 32 connected to corresponding fuel injectors of the engine 12. The fuel injectors meter an amount of fuel to cylinders of the engine 12 in response to a pulsewidth value output from the engine controller 30 via fuel injector output lines 32. The electronic fuel injection system also includes a throttle position sensor 34 connected to the throttle body 26 and the engine controller 30 to sense an angular position of a throttle plate in the throttle body 26. The electronic fuel injection system includes a manifold absolute pressure (MAP) sensor 36 connected to the intake manifold 24 and the engine controller 30 to sense manifold absolute pressure. The electronic fuel injection system also includes a coolant temperature sensor 38 connected to the engine 12 and the engine controller 30 to sense a temperature of the engine 12. The electronic fuel injection system further includes an oxygen sensor 40 connected to the upstream conduit 20 of the exhaust system 14. The oxygen sensor 40 is further connected to the engine controller 30 to provide oxygen level readings detected in the exhaust gas to the engine controller.

In one embodiment, the hybrid vehicle further includes a crankshaft sensor target 52 operatively connected to the crankshaft 48. The vehicle also includes a crankshaft sensor 58 for communicating with the crankshaft sensor target 52 and a camshaft sensor assembly 60 in communication with the camshaft. The outputs of the sensors 58, 60, 36, 34, and 38 all communicate with the engine controller 30.

The electric motor/generator 150 has a rotor 152 mechanically connected to combustion engine 12 via crankshaft 48. The rotation of rotor 152 is controlled by a rotating magnetic field produced by the stator 154 contained within electric motor/generator 150 and surrounding rotor 152. Three separate current outputs are needed to produce the requisite magnetic field in stator 154. These three current outputs are generated by inverter 156 that communicates with electric motor/generator 150. DC Voltage supplied by the high voltage battery (not shown) provides power to inverter 156. Motor controller 160 produces the control waveforms needed by inverter 156 to produce the requisite current outputs to electric motor/generator 150. Power inverter 156, resolver 157, and current sensors 158 are all in communication with both electric motor/generator 150 and motor controller 160. Motor controller 160 uses feedback from current sensors 158, speed and position of rotor 152 provided by resolver 157, and DC voltage measurements to measure and control the mechanical torque of electrical motor/generator 150. Various methods of measurement and control of electric motor torque may be employed and are well known to those skilled in the art. For example, direct vector control, indirect vector control, or feed forward control methods are commonly known and are applicable in the present invention, however, the invention is not so limited. Additionally, Motor Controller 160 is in communication with Engine Controller 30, via information bus 180.

Figure 2:
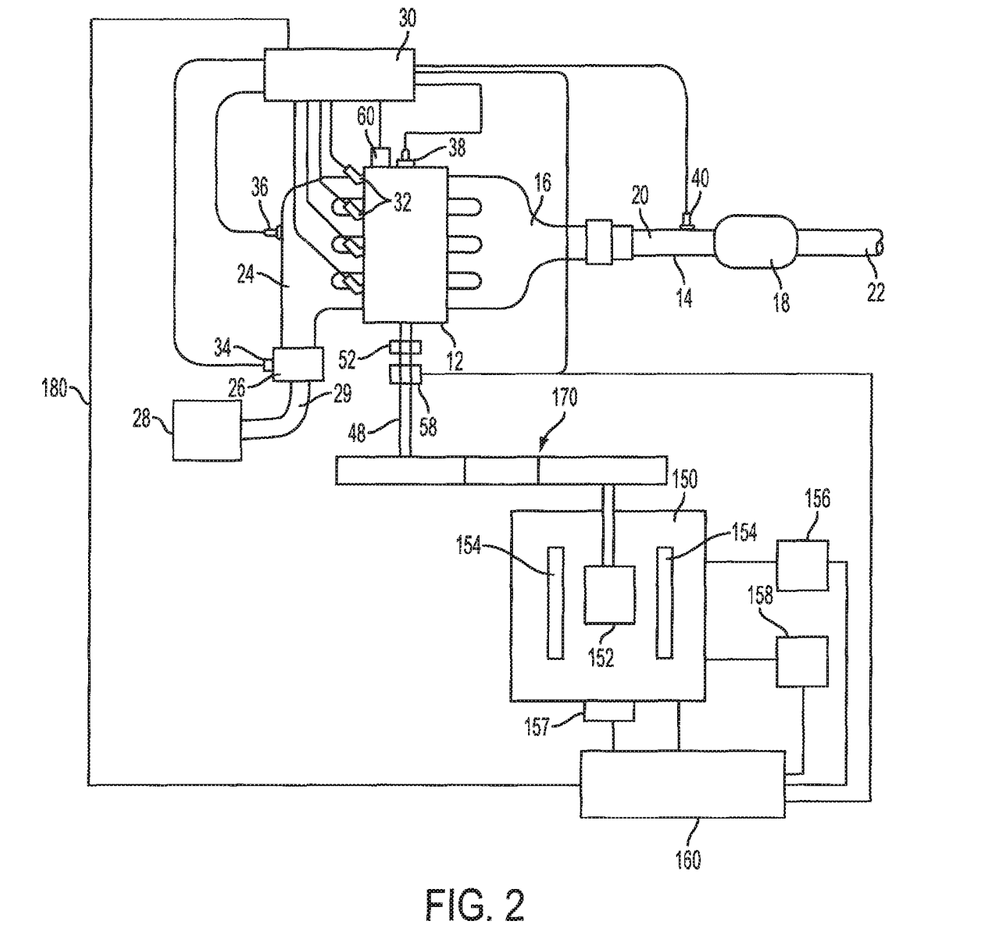
FIG. 2 is a schematic diagram of an alternate embodiment of the electronic fuel injection system wherein an electric motor/generator is coupled to the internal combustion engine through a gear train.

FIG. 2 depicts an alternate embodiment of the present invention wherein, rotor 152 of electric motor/generator 150 is mechanically coupled to combustion engine 12 via gear train 170. The crankshaft position of engine 12 obtained from the crankshaft sensor 58 is also provided to motor controller 160.

Figure 3:
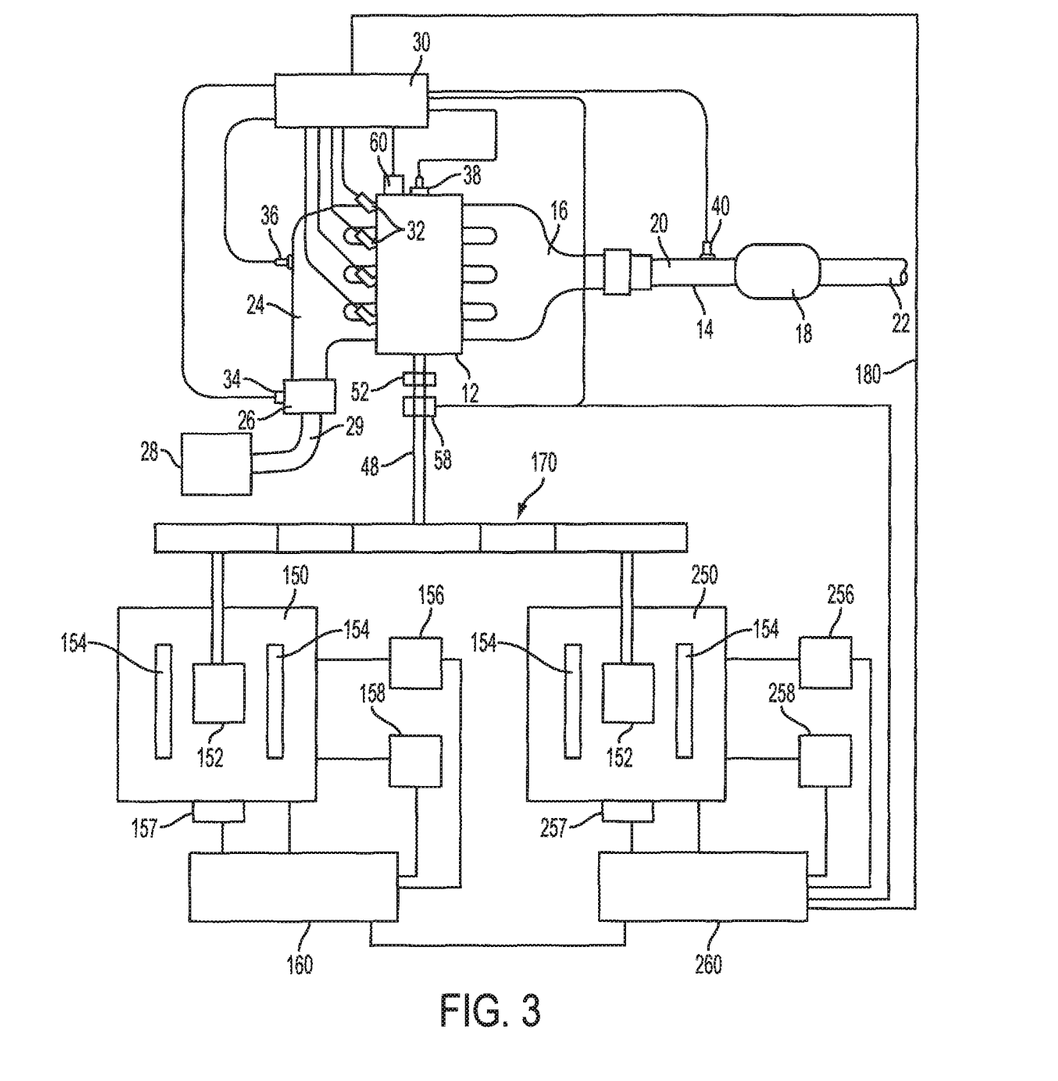
FIG. 3 is a schematic diagram of an alternate embodiment of the electronic fuel injection system wherein two electric motor/generators are coupled to the internal combustion engine through a gear train.

FIG. 3 depicts an embodiment of the present invention wherein more than one electrical motor is present in the hybrid vehicle. As shown in FIG. 3, the first electrical motor/generator 150 and the second electric motor/generator 250 are mechanically coupled to combustion engine 12 via gear train 170. The second electric motor/generator 250 is also equipped with an inverter 256, resolver 257, current sensors 258, and a second motor controller 260. The second motor controller 260 communicates with motor controller 160 and with engine controller 30 via information bus 180. The crankshaft position of engine 12 obtained from the crankshaft sensor 58 is also provided to second motor controller 260.

In one embodiment, engine controller 30 and motor controller 160 include microcontrollers with a digital filter, memory, signal conditioning circuitry, analog-to-digital (ND) converters and a resolver to digital converter (R2D) to process outputs from the various sensors previously identified. In one embodiment, the outputs of crankshaft sensor 58 and camshaft sensor 60 communicate with the microcontroller of engine controller 30 via signal conditioning circuitry. The output of the manifold absolute pressure sensor 36, throttle position sensor 34 and engine coolant temperature sensor 38 communicate with the microcontroller of engine controller 30 via A/D converters. The memory of the engine controller 30 and motor controller 160 may be any generic memory, including but not limited to Random Access Memory (RAM), Read Only Memory (ROM), or other appropriate memory. It should also be appreciated that the engine controller 30 and motor controller 160 may also include various timers, counters and like components necessary for the described functioning as would be understood by those skilled in the art.

Figure 4:
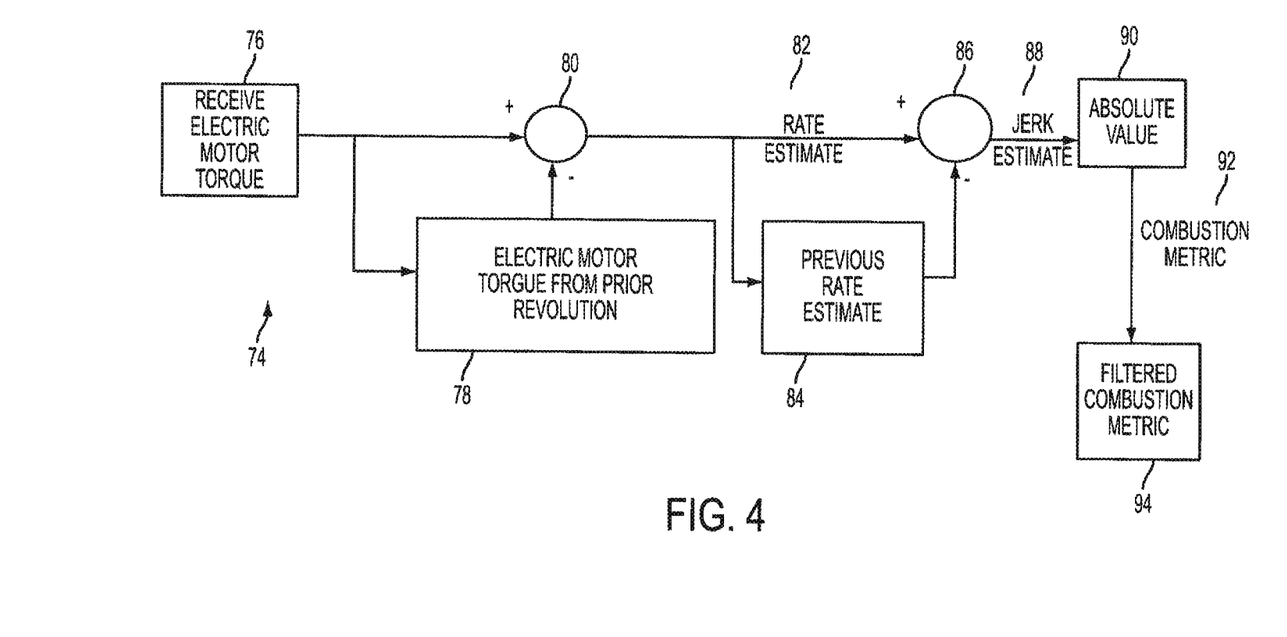
FIG. 4 is a flow diagram illustrating a methodology of computing a calculated combustion metric value indicative of the combustion stability of the engine according to the present invention.

Engine controller 30 and motor controller 160 are used to determine a calculated combustion stability value and modify a fuel injection control signal. Disclosed in FIG. 4 is a methodology 74 of computing a calculated combustion metric value indicative of the combustion stability of engine 12. Methodology 74 is carried out by engine controller 30 after receiving a torque signal 76 provided from electrical motor/generator 150 via information bus 180 from motor controller 160. Torque signal 76 is determined as described above and associated with a narrow angular position of combustion engine 12. One intent of the methodology is to create a filtering effect of the electric motor torque signal. Use of an electric motor torque value observed in association with a cylinder within the engine 12, and comparison of the motor torque signal with a motor torque signal associated with the same cylinder one or more crank rotations previous has been found to create the desired filtering effect. For example, this method can be successfully employed for the removal of torque ripple from signals obtained from an electrical motor. It should be understood by those skilled in the art that other implementations of motor torque signal filtering known in the industry are also contemplated by this invention.

As shown in FIG. 4, in one embodiment of the present invention, the electric motor torque signal for the present cylinder revolution (n) is compared with the motor torque signal occurring one revolution earlier (n−1) than the present revolution as shown by comparison block 80. The comparison block 80 provides a difference value between the present (n) motor torque 76 and the motor torque determined one revolution earlier (n−1) 78. The determined difference value is identified as a rate estimate value 82. The present (m) rate estimate value 82 is compared with the previous (m−1) rate estimate value 84 via a comparator 86. Comparator 86 computes the difference between the present (m) rate estimate value and the previous (m−1) rate estimate value and outputs a jerk estimate value 88. An absolute value of the jerk estimate value 88 is taken in block 90 and provides an absolute positive output value combustion metric value 92.

In an alternate embodiment of the present invention, the motor torque signal taken at least two revolutions earlier (n−2, n−3, etc.) is compared to the present (n) motor torque value to provide a difference value.

The combustion metric value 92 is low pass filtered and shown output pursuant to block 94. Accordingly, methodology 74 computes an output filtered combustion metric value based on the difference between successive rate estimate values as determined from the received motor torque signal 76. The output combustion metric value 94 is a calculated value indicative of the combustion stability of the engine and therefore provides an indication of the roughness of the engine combustion.

In an embodiment of the present invention where the system comprises more than one electric motor and motor controller, the filtering of the motor torque signals can be accomplished using motor torque readings acquired from each motor. In this embodiment, the motor controllers communicate with each other, and the crankshaft position of engine 12 obtained from the crankshaft sensor 58 is also provided to at least one of the motor controllers, as shown in FIG. 3. This motor controller calculates the relative operating torque and speed of both electric motors in comparison to the position of the engine crankshaft and establishes a combined electric motor torque value that is then used to compute an output combustion metric value, as described in FIG. 4.

Figure 5:
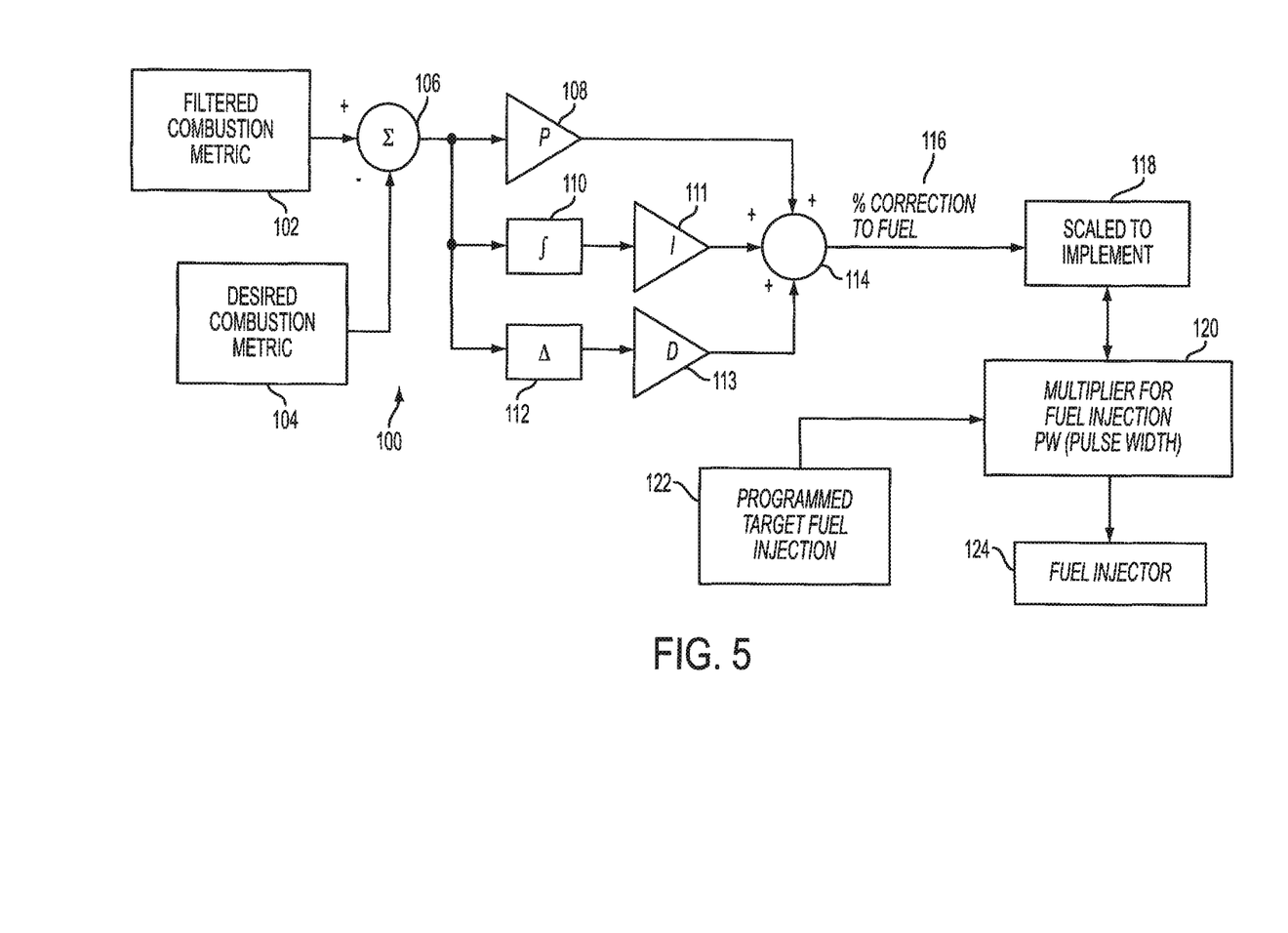
FIG. 5 is a flow diagram illustrating use of the computed combustion metric value to modify fuel injection to an engine according to the present invention.

Disclosed in FIG. 5 is a methodology 100 for modifying the fuel injection pulsewidth signal to fuel injectors of the engine as a function of the combustion metric value according to the present invention. Fuel injection modification methodology 100 computes an average combustion metric value from the combustion metric value as provided in block 102 and compares the average combustion metric value with a desired combustion metric value 104 as provided by comparator 106.

The desired combustion metric value is preferably calculated as a function of engine speed, engine load (for example: intake manifold absolute pressure), ambient pressure, time after starting and coolant temperature and fuel type if available. The desired combustion metric offers a target value for controlling the fuel injection to the engine. Comparator 106 outputs a difference value between the average combustion metric value and the desired combustion metric, and provides the input value for proportional-integral-derivative (PID) control. The PID control includes a proportional (P) gain block 108, an integral ($\int$) block 110, and a differential ($\Delta$) block 112. Each of the proportional, integral and differential blocks 108, 110 and 112, respectively, receives the output from comparator 106. The output from the proportional gain block 108 is applied to a summation block 114. The output of the integral block 110 is applied to a gain (I) block 111 and then output to the summation block 114. The output of the differential block 112 is applied to a gain (D) block 113 and then output to the summation block 114. The summation block 114 sums the inputs so as to provide a percentage correction value 116 that in turn is used to modify the fuel injection to the engine. The percentage correction value 116 is scaled in block 118 for implementation as a multiplier value.

Scaling of the percentage correction value may be accomplished by adding 1.0 to the fractional percentage correction value, according to one embodiment. Methodology 100 provides a multiplier for the fuel injection pulsewidth such that the amount of fuel injected to the engine may be reduced from the scheduled amount provided in the calculated target fuel injection value 122. Accordingly, the calculated target fuel injection 122 is scaled by way of the multiplier 120 to realize a change of fuel supplied by the fuel injectors as provided in block 124.

Figure 6:
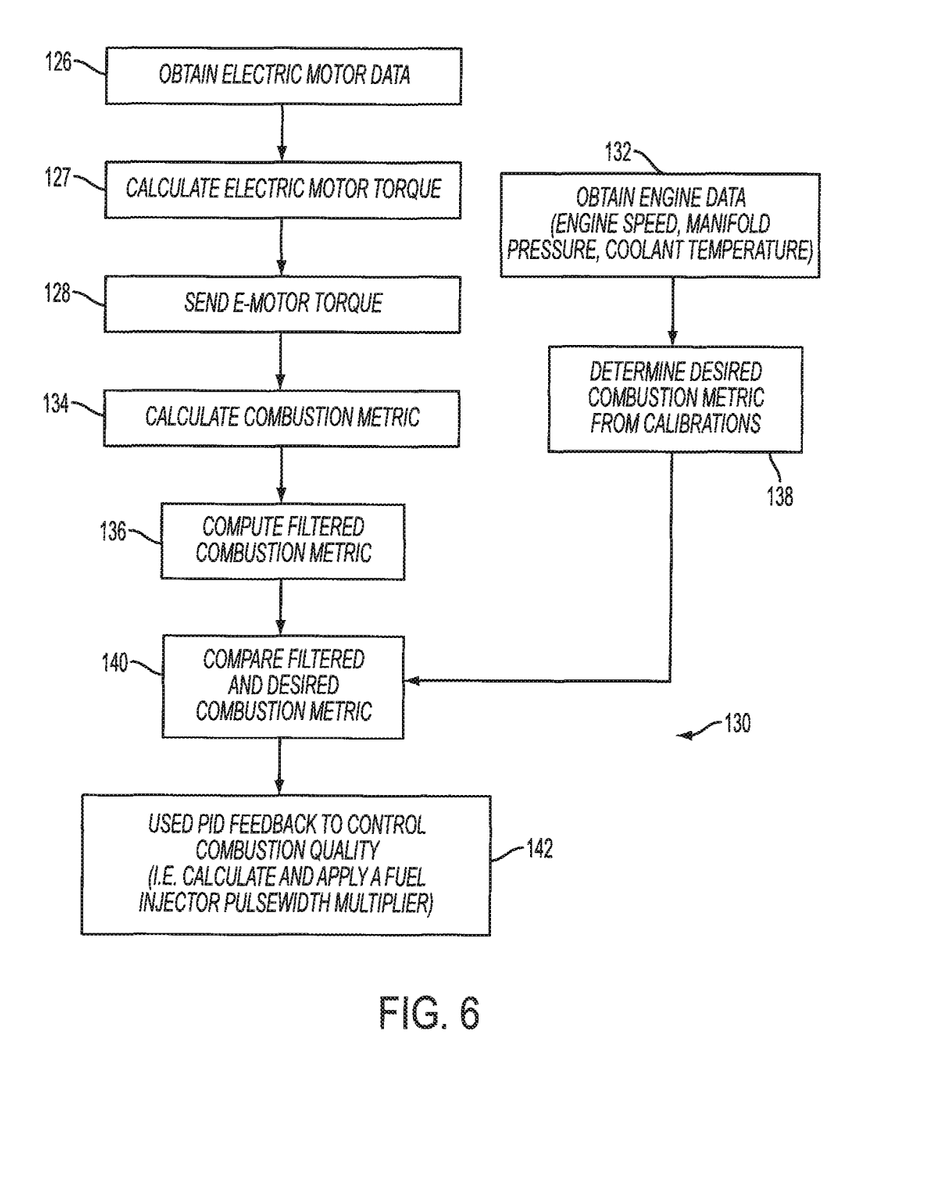
FIG. 6 is a flow diagram further illustrating the methodology of calculating the combustion metric value and modifying fuel injection to the engine according to the present invention.

Disclosed in FIG. 6 is a methodology 130 for computing a calculated combustion stability value and utilizing the combustion stability value to provide fuel modification to fuel injectors of the engine. Methodology 130 obtains engine data such as engine speed, manifold absolute pressure and coolant temperature in block 132. Methodology 130 proceeds to determine a desired combustion metric value from the engine data and calibrations as provided in block 138. Methodology 130 also obtain electric motor data, as shown in block 126, then proceeds to block 127 to calculate the electric motor torque. This electric motor torque is sent to the engine controller in block 128, and based on this input, the engine controller calculates the absolute value of the combustion metric, as shown in block 134. The engine controller then computes a filtered combustion metric, as shown in block 136. The computed filtered combustion metric value and the determined desired combustion metric value are compared via block 140 to provide a difference output between the two input signals. Methodology 100 uses proportional-integral-differential (PID) feedback to control the combustion quality of the engine by calculating and applying a fuel injector pulsewidth multiplier to the calculated fuel injection signal to change the amount of fuel applied to the engine, as shown in block 142, and described in FIG. 3. This methodology allows for a reduction in fuel consumption while maintaining adequate drivability and performance of the vehicle. In addition, emissions are reduced, especially following a cold engine start of the vehicle when the oxygen sensor and/or feedback control may not be available.

The disclosed methods and embodiments of the present invention are applicable to port fuel injection engines, direct fuel injection engines or a combination of the two. The physical effect in the cylinder is not dependent on how the fuel is delivered. While the disclosed embodiments utilize a permanent-magnet type electrical motor/generator, other electrical motors may also be utilized. For example, switched reluctance, or inductive type electric motors may be employed. Furthermore, the present invention may extended to other hybrid vehicle arrangements where the mechanical relationship between the one or more electric motors and the internal combustion engine differs from that disclosed. For example, physical coupling of the one or more electrical motors to the engine via a planetary gear set or gear train in an alternate arrangement. In systems wherein the at least one electric motor and engine may have different speeds of revolution, the filtering of the motor torque signal is normalized based on the angle of the reading of the electrical motor or motors.

The disclosed methods and embodiments therefor allow for improvements in a fuel control system of a hybrid vehicle by controlling the fuel injection to the engine based on a torque signal obtained from the vehicle's electric motor that is mechanically coupled to the engine.

The invention claimed is:

1. A system for controlling fuel injection in a hybrid vehicle, the system comprising:
    an internal combustion engine having at least one fuel injector;
    first and second electric motors each having a rotor and a stator, the rotors mechanically connected to the internal combustion engine;
    an engine controller connected to the at least one fuel injector; and
    first and second motor controllers connected to the first and second electric motors and the engine controller;
    wherein the engine controller controls the amount of fuel supplied to the fuel injector of the internal combustion engine based on a calculated combustion stability value determined as a function of motor torque signals obtained from the first and second electric motors via the first and second motor controllers.

2. The system according to claim 1, further comprising:
    resolvers connected to the electric motors and motor controllers; and
    current sensors connected to the electric motors and motor controllers;
    wherein the motor controllers use feedback from the current sensors and resolvers to measure and control the electric motors.

3. The system according to claim 1, wherein the motor controllers and the engine controller each include a microcontroller with a digital filter, a memory, and signal conditioning circuitry to process outputs for sensors within the vehicle.

4. The system according to claim 1, wherein the calculated combustion stability value is based on a difference between successive rate estimate values of the electric motors determined by associating a first motor torque value provided from one of the motor controllers with a position of a cylinder within the combustion engine, and comparing said first motor torque value with a second motor torque value associated with said cylinder one revolution earlier.

5. The system according to claim 1, wherein the calculated combustion stability value is based on a difference between successive rate estimate values of the electric motors determined by associating a first motor torque value provided from one of the motor controllers with a position of a cylinder within the combustion engine, and comparing said first motor torque value with a second motor torque value associated with said cylinder at least two revolutions earlier.

6. The system of claim 1, wherein the fuel supplied to the internal combustion engine is controlled by a fuel injection pulsewidth signal sent from the engine controller to the at least one fuel injector; where the fuel injection pulsewidth signal is modified by comparing an average combustion metric value with a desired combustion metric value.

7. The system of claim 6, wherein the desired combustion metric value is calculated as a function of engine speed, engine load, ambient pressure, time, and coolant temperature.

8. The system of claim 1 wherein the motor torque signals are normalized based on an angle of motor torque readings of the electrical motors.

9. A method for controlling fuel injection in a hybrid vehicle, the method comprising:
    determining a combustion stability value for an internal combustion engine as a function of motor torque signals obtained from two electric motors within the hybrid vehicle; and
    modifying the amount of fuel supplied to a fuel injector of the internal combustion engine based on the combustion stability value.

10. The method of claim 9, wherein the calculated combustion stability value is based on a difference between successive rate estimate values of the electric motors determined by associating a first motor torque value provided from a motor controller with a position of a cylinder within the combustion engine, and comparing said first motor torque value with a second motor torque value associated with said cylinder one revolution earlier.

11. The method of claim 9, wherein the calculated combustion stability value is based on a difference between successive rate estimate values of the electric motors determined by associating a first motor torque value provided from a motor controller with a position of a cylinder within the combustion engine, and comparing said first motor torque value with a second motor torque value associated with said cylinder at least two revolutions earlier.

12. The method of claim 9, wherein the fuel supplied to the internal combustion engine is controlled by a fuel injection pulsewidth signal sent from an engine controller to at least one fuel injector; where the fuel injection pulsewidth signal is modified by comparing an average combustion metric value with a desired combustion metric value.

13. The method of claim 12, wherein the desired combustion metric value is calculated as a function of engine speed, engine load, ambient pressure, time, and coolant temperature.

14. The method of claim 9, wherein the motor torque signals are normalized based on an angle of motor torque readings of the electric motors.

* * * * *